United States Patent [19]
Rein et al.

[11] 3,853,532
[45] Dec. 10, 1974

[54] ALIPHATIC MONOKETONES AS TOBACCO PLANT SUCKER GROWTH CONTROL AGENTS

[75] Inventors: Burton Maxwell Rein, East Brunswick; Benjamin Weinstein, Morganville, both of N.J.

[73] Assignee: Mobile Oil Corporation, New York, N.Y.

[22] Filed: July 21, 1972

[21] Appl. No.: 273,901

Related U.S. Application Data

[63] Continuation-in-part of Ser. No. 133,366, April 12, 1971, abandoned, which is a continuation-in-part of Ser. No. 95,322, Dec. 4, 1970, abandoned.

[52] U.S. Cl. .................... 71/78, 71/123, 71/DIG. 1
[51] Int. Cl. ............................................ A01n 9/24
[58] Field of Search ............................. 71/78, 123

[56] References Cited
UNITED STATES PATENTS

| | | | |
|---|---|---|---|
| 2,805,926 | 9/1957 | Schoene | 71/78 |
| 3,340,040 | 9/1967 | Tso | 71/78 |
| 3,438,765 | 4/1969 | Tso et al. | 71/78 |
| 3,443,928 | 5/1969 | Batchelor | 71/78 |
| 3,556,763 | 1/1971 | Gower et al. | 71/78 |
| 3,592,910 | 7/1971 | Clark et al. | 71/DIG. 1 |

FOREIGN PATENTS OR APPLICATIONS 905,821   9/1962   Great Britain ............... 260/593 R

OTHER PUBLICATIONS

Rabilloud, "Addm. Reactions Ivit. by Radiation etc.," (1966), CA64, pp. 15732–15733, (1966).
Jahnsen, "Complexity of Bop Oil," (1962), CA58, p. 4371, (1963).
Tso et al. II, "Prelin. Abs. on Inhibition of Tobacco Suckers, Etc.," (1963), Tobacco Science 156, pp. 23–27, (1963).

*Primary Examiner*—Glennon H. Hollrah
*Attorney, Agent, or Firm*—Andrew L. Gaboriault; Mitchell G. Condos; Howard M. Flournoy

[57] ABSTRACT

Aliphatic monoketones, as exemplified by 2-dodecanone and 2-undecanone, are highly effective for controlling axillary growth (i.e., sucker growth) on tobacco plants.

10 Claims, No Drawings

3,853,532

ALIPHATIC MONOKETONES AS TOBACCO PLANT SUCKER GROWTH CONTROL AGENTS

CROSS-REFERENCE TO RELATED APPLICATIONS

This is a continuation-in-part of application Ser. No. 133,366, filed Apr. 12, 1971, and now abandoned entitled ALIPHATIC MONOKETONES AS TOBACCO PLANT SUCKER GROWTH CONTROL AGENTS which is a continuation-in-part of application Ser. No. 95,322, filed Dec. 4, 1970, and now abandoned, entitled PLANT GROWTH REGULATORY AGENT AND TREATMENT.

BACKGROUND OF THE INVENTION

1. Field of the Invention

This invention relates to methods and compositions of matter for control of axillary growth (i.e., sucker growth) on tobacco plants.

2. Prior Art

In the case of tobacco plants, obtaining the maximum yield of tobacco of good quality requires removal of the flower or reproductive growth from the leaves or vegetative growth of the plant. This process is known as topping. If the topping is delayed beyond the early flower stage, yields are significantly decreased with each day of the delay. Once the plant is topped by cutting, axillary growth between each leaf and the stalk begins. This sucker growth must be controlled to prevent decreases in both yield and quality which are similar to those that result from not topping the tobacco plant. Sucker control is particularly important when mechanical harvesting is employed for the crop.

For many years suckers were individually pulled from the topped plants by hand several times during the growing season at a considerable labor cost. More recently a variety of chemical agents have been employed for the purpose with varying degrees of success. As one of the early contact treatments, the application by hand of mineral oil to the top of the stalk to run down and kill the sucker initials by contact was an improvement over the manual operation. It was not completely satisfactory because it provided only partial and short term control while introducing stalk and leaf rotting problems.

Subsequently, liquids containing maleic hydrazide derivatives like those described in Schoene et al. U.S. Pat. No. 2,805,926, have been sprayed effectively as systemic agents for the control of suckers on much of the domestic tobacco crop. However, these agents have their limitations; it has been found that they should not be applied until tobacco flowers reach the late bloom stage in order to avoid retarding the growth of the leaves, which involves a loss in quality and approximately 25 pounds less yield per acre for every day the topping of tobacco is delayed beyond the early flower stage. To minimize such losses, a number of dual treatments have been devised wherein a contact agent has been sprayed on the tobacco immediately after topping in early bloom followed by treatment at an appropriate later date with a maleic hydrazide derivative for systemic action. The systemic agent acts within the plant system, and the timing of its application is critical because all parts of the plant are affected by it. On the other hand, the contact agent affects only the exterior of the plant in tending to inhibit new growth (i.e., the sucker) and to stimulate the further growth of established leaves and thus produce the larger leaves which are desired. Accordingly, while such systemic agents provide good sucker control over a longer period of time than the contact materials, the contact agents have the important advantage of being usable at an ideal early treating time to enhance the yield and quality of tobacco.

Among the known contact control agents are fatty acid derivatives such as dimethyldodecylamine acetate, esters of fatty acids, as exemplified by methyl caprate, and mixtures of octanol and decanol dispersed in a suitable liquid carrier. In contrast with the laborious topical application of mineral oils, both these contact agents and the systemic agents may be readily applied by spraying. Currently, the use of two-step dual treatments is increasing as they have provided the best overall sucker control, especially for mechanically harvested crops.

It is not known with any certainty why fatty acid derivatives are effective "chemical pruning agents." Superficially it might appear that their activity is strictly a function of chain length. However, H. M. Cathey and G. L. Steffens present evidence that factors other than chain length are criteria also to be considered. For example, in their article, "Relation of the Structure of Fatty Acid Derivatives to Their Action as Chemical Pruning Agents," *Society of the Chemical Industry* Monograph No. 30, London, England, 1968, they concluded that the position and number of carbons making up fatty acid esters alter their effectiveness; that $C_8$, $C_9$, $C_{10}$ and $C_{12}$ fatty alcohols were highly effective, while the $C_{11}$ alcohol, 1-undecanol killed both terminal meristems and auxillary buds and $C_6$ and $C_7$ alcohols were inactive at equal concentrations. This zig zag profile of activity indicates that acivity as a function of chain length is not predictable. The article concludes with a comment by Dr. Cathey in which he states that many fatty compounds were tested as chemical pruning agents but the active compounds found as a result of such tests were fatty acid esters or alcohols. It is, therefore, quite surprising and unexpected that aliphatic ketones according to this invention are effective control agents.

Certain embodiments of the instant invention are also particularly concerned with novel contact treatments for inhibiting the development of suckers on tobacco.

SUMMARY OF THE INVENTION

The present invention relates to both compositions of matter for controlling tobacco plant sucker growth and methods of treating tobacco plants by contact with such compositions. These compositions of matter comprise at least one substantially non-volatile aliphatic monoketone having at least 4 carbon atoms, and more specifically, 4 to about 18 carbon atoms, and an inert solid or liquid carrier therefor.

Narrower aspects of this invention involve one or more of such features as preferred 2-ketone, especially 2-dodecanone and 2-undecanone; a carrier material which includes a solvent or a surfactant for dispersing the ketone; and the utilization of an aqueous dispersion of said ketone in treating tobacco plants.

DESCRIPTION OF SPECIFIC EMBODIMENTS

In addition to conventional carrier materials, the compositions of this invention contain at least one aliphatic monoketone having at least 4 carbon atoms, more specifically 4 to about 18 carbon atoms and, still more specifically, 8 to 18 carbon atoms, as illustrated by hexanone, decanone, undecanone, hexadecanone and octadecanone. These ketones may be either straight chain, branched chain or cyclic in structure. In general, the 2-ketones are preferred, particularly 2-dodecanone and 2-undecanone, but the keto group may be located elsewhere, as exemplified by 4-dodecanone. Other exemplary ketones are 2-methyl-3-decanone and 4-nonylcyclohexanone. These ketones can be prepared by a variety of known methods.

In carrying out the method of this invention for selectively regulating tobacco plant sucker growth, the treating agent may be applied to the plants in various ways. For instance, the compositions may be applied in a growth-controlling amount in the form of solutions or aqueous dispersions or more desirably by spraying.

A great many liquid carrier materials may be employed in combination with the ketone including, inter alia, organic solvents of relatively low phytotoxicity, such as methanol, butanol, amyl acetate, xylenes, mineral oils, certain chlorinated hydrocarbons (e.g., ethylene dichloride), butane, propane and other gases compressed to the liquid state, as well as surfactants for dispersing the ketone in water and water for such aqueous dispersions. As the surfactant component, anionic and nonionic emulsifiers or surface active agents are often preferred since many more of them have received the approval of agricultural authorities than cationic surfactants, but many of the latter type should be operative for dispersing the ketone. In general, almost any solid or liquid material may be used as a carrier which is capable of dissolving or dispersing the ketone in substantial dilution and which is not harmful to the tobacco plant or its intended use, especially materials that are commonly used as carriers for other agricultural treating compounds. In most instances an aqueous carrier is preferred. Further, the carriers may include binding agents for holding the ketone in contact with the plant and/or various film-forming agents, as exemplified by mineral and ester waxes, and natural and synthetic resins and polymers, to minimize the loss of the ketone from the treated plant by evaporation or the washing action of rain.

In many instances, it is preferred to apply the compositions as rather dilute solutions or dispersions of the ketone over the top of the tobacco plant and around the upper portion of its foliage to the extent of run-off in order to insure contact with sucker growth as the liquid drains down the stem of the plant. The plants are generally treated in an early stage of growth before the suckers are well developed; however, the new suckers can also be treated. It is particularly desirable for the application to immediately follow mechanical topping of plants in early bloom.

The compositions of the present invention are excellent contact control agents for inhibiting sucker development on tobacco plants by a wholly external action and thereby stimulating the further development of established foliage in growing the large tobacco leaves which are prized in the market. This contact treatment is regarded as a special type of chemical pinching activity on tobacco, and it may be employed alone for sucker control or it may be used in conjunction with the application of a systemic agent at an appropriate time in a treatment.

The quantities of the present compositions that are required for such purposes vary considerably as they are dependent upon a number of factors, including the size and type of plant undergoing treatment, the ketone selected, the method of applying the agent, the stage of sucker growth and atmospheric conditions, such as temperature and rainfall. Accordingly, the quantity of active treating agent for any particular application is best determined by experiment. In the case of young tobacco plants that have just been topped, sucker development can often be appreciably restricted by the application of about 0.01 ounce of the active pinching agent in a suitably diluted liquid carrier per plant, but better results are usually obtained with a treatment involving at least 0.03 ounce of the aliphatic ketone per plant; and these figures include the quantity of active material lost in the applicataion by the run-off of treating solution involved in thoroughly wetting all axils of plant. For treating various plants on an acreage basis, an initial application at the rate of about 8 pounds of ketone per acre may be employed as a trial for determining the optimum treatment.

For a better understanding of the nature, objects and advantages of this invention, reference should be had to the following detailed examples which are intended for illustration rather than as limitations on the scope of this invention. Unless specified otherwise, all proportions in this specification are set forth in terms of weight.

EXAMPLES 1 – 24

In a series of 24 greenhouse tests of individual potted tobacco plants which had reached the flowering stage and had been topped on the day of treatment, aqueous dispersions of 2-dodecanone (i.e., examples 1–19) and 2-undecanone (i.e., examples 20–24) containing various different commercial surfactants, and also film-forming agents in several instances, were tested for sucker control under comparable conditions. The surface active substances and film-forming materials are listed in the table hereinafter along with the results observed 3 weeks after treatment of the tobacco plants.

In examples 1–14, the dispersions were initially prepared in concentrated form by stirring 10 parts of the ketone (91 percent pure) and 5 parts of the surfactant or surfactant mixture into 85 parts by weight of water at 68°–86°F. until stable and homogeneous dispersions were obtained. In Examples 11, 12 and 13, the quantity of water was reduced to 80 parts and 5 parts of a film-forming substance was added. The treating composition of Example 11 was prepared by mixing the ketone and polyoxyethylene [20] sorbitan monolaurate into water, and then heating the mixture to 140°F. before adding the wax in molten condition with sufficient agitation to form a stable emulsion. The surfactant serves a dual purpose of emulsifying or dispersing the long chain ketone in water and also of improving the wetting characteristics of the final treating liquid plants. In addition, it acts as an agent for dispersing hydrophobic film-forming substances in aqueous carriers to retain the ketone on the plant upon exposure to outside weather conditions. The methyl cellulose in the compositions of Example 14 has a dual function in acting first to disperse the ketone and later as a film-forming agent after the aqueous dispersion has been applied to the plant.

Each of the concentrated dispersions or emulsions was diluted with water to provide a treating liquid with a 2-dodecanone content of about 3 percent by weight; and an atomizer was employed to spray 10 ml. of the dilute agent on the upper foliage of the deflowered tobacco plants.

In Examples 15–24, the formulations were prepared in accordance with the following tabulation:

The surfactant of Example 2 is of the "spreader sticker" variety for both promoting the spreading of the aqueous dispersion on leaf surfaces and also providing improved adhesion and rain-resistance of the dried spray deposit on plant surfaces; and that employed in Example 4, 15–17 and 20–22 is of the "sticker" type to enhance adhesion and resistance to being washed off by rain.

From the foregoing data, it will be noted that the compounds for use in this invention do an excellent job

| EXAMPLE | FORMULATION INGREDIENTS* | | | | |
|---|---|---|---|---|---|
| | %2-dodecanone (91% pure) | (1) | % Surfactant or Film-Forming Agent (2) | (3) | (4) | % Water |
| 15 | 27.1 | 13.6 | 59.3 | | | |
| 16 | 27.6 | 27.6 | 44.8 | | | |
| 17 | 25.7 | 51.4 | 22.9 | | | |
| 18 | 25.5 | | | 6.4 | 12.7 | 55.4 |
| 19 | 26.1 | | | 6.5 | 26.1 | 41.3 |
| | % 2-undecanone | | | | | |
| 20 | 28.7 | 14.4 | 56.9 | | | |
| 21 | 27.6 | 27.6 | 44.8 | | | |
| 22 | 25.4 | 50.8 | 23.8 | | | |
| 23 | 25.8 | | | 6.5 | 12.9 | 54.8 |
| 24 | 26.1 | | | 6.5 | 26.1 | 41.3 |

* is percent by weight
(1) "Maran B" Potassium rosin soap-paste.
(2) Methanol
(3) "Tween 20" Polyoxyethylene [20] sorbitan monolaurate.
(4) Paraffin wax as film forming agent.

Again, an atomizer was employed to spray 10 ml of the dilute agent on the upper foliage of the deflowered tobacco plants.

There weeks after the treatment, each plant was subjected to a careful inspection and the results are tabulated in the following Table:

of controlling suckers. These examples also indicate that acceptably low phytotoxicity is obtainable in treatments employing a substantial number of surfactants of widely different chemical structure. In Examples 13 and 24, substantial phytotoxicity was encountered with a treating liquid containing polyoxyethylene [20] sorbi-

TABLE

| EXAMPLE | SURFACTANT | FILM-FORMING AGENT | OBSERVATIONS- 3 WEEKS | |
|---|---|---|---|---|
| | | | PHYTOTOXICITY | SUCKER CONTROL ACTIVITY |
| 1 | "Atplus 110" Polyoxyethylene [20] sorbitan monooleate with mono- & diglycerides | — | Low | Yes |
| 2 | "Triton B-1956" Modified glycerol-phthalic alkyl resin | — | Low | Yes |
| 3 | "Aerosol 18" Disodium octadecyl sulfosuccinamate | — | Low | Yes |
| 4 | "Maran D" Potassium rosin soap-paste | — | Low | Yes |
| 5 | "Maran F" Rosin soap-liquid | — | Low | Yes |
| 6 | "Centromix LP 250" Lecithin base | — | Low | Yes |
| 7 | Sucrose monolaurate | — | Low | Yes |
| 8 | "Span-20" Sorbital monolaurate | — | Low | Yes |
| 9 | "Tween-20" Polyoxyethylene [20] sorbitan monolaurate | — | Substantial | Yes |
| 10 | 50—50 "Tween-20" & "Span-20" | — | Low | Yes |
| 11 | "Tween-20" | Paraffin wax | Low | Yes |
| 12 | "Tween-20" | Polybutenylamine amide (650 av. mol. wt.) | Low | Yes |
| 13 | "Tween-20" | Polystyrene S-37 (Surfactant serves) | Low | Yes |
| 14 | Methyl cellulose | | Low | Yes |
| 15 | do. | | Low | Poor to no control |
| 16 | do. | | None | Yes |
| 17 | do. | | None | Yes |
| 18 | do. | | None | Yes |
| 19 | do. | | None | Yes |
| 20 | do. | None | Yes | |
| 21 | do. | | None | Yes |
| 22 | do. | None | Yes | |
| 23 | do. | | Low | Yes |
| 24 | do. | Substantial | Yes | | tan monolaurate as the surfactant. However, no such trouble occurred in Example 15, 16 and 17 with one of several different film-forming substances present in an otherwise similar dispersion, and low phytotoxic characteristics were observed in Example 14 in which half portion of the same surfactant was replaced by an equal weight of sorbitan monolaurate. Thus, it is possible in at least some instances to eliminate or minimize plant damage that is apparently attributable to some surfactants by incorporating certain types of film-forming agents in the treating liquid or by substituting another surface active agent for part or all of a surfactant that is suspected of causing such damage.

EXAMPLE 25

The treating agent of Example 4 was subjected to a field test on tobacco after diluting the concentrated dispersion of 2-dodecanone and rosin soap with more water to a concentration of the active ketone approximating 2 percent. Twenty tobacco plants growing in an open field were topped while in an early flowering stage and the upper foliage of each of ten of these plants was sprayed to run-off with approximately 1 ounce of the diluted agent by means of an atomizer, while the remaining 10 plants were maintained as controls and not subject to any treatment. Three weeks later, each of the plants was closely inspected and evaluated as to sucker control activity by listing a numerical rating ranging from 0 for no apparent inhibition of sucker development to 4 for 100 percent sucker control; phytotoxic effects were similarly evaluated on the scale of 0 for no observable plant damage ranging up to 4 for complete destruction of the plant. After averaging the individual ratings, the treated plants were found to have a 2.2 index for sucker control activity which is indicative of good control of suckers and phytotoxicity rating of 0.7 representing only slight plant damage. The untreated plants displayed no restriction of sucker development and no phytotoxic effects, and accordingly received index ratings of 0 in both categories.

EXAMPLE 26

Simultaneously, another field test was carried out in the same manner as Example 25 with the same untreated or control plants and with ten similar plants which were each subjected to a spray treatment with about 1 ounce of the same agent in a more concentrated form namely a 3 percent of the technical 2-dodecanone. Upon evaluating the results of this treatment, the average sucker control activity index of 3.2 represented very good sucker control and the average phytotoxicity rating was 0.7. In comparison with two widely used commercial preparations for sucker control, a systemic agent and one of the contact control types, the sucker control activity displayed here by the present ketone-containing material was found to be similar.

EXAMPLES 27 – 38

To further illustrate the tobacco sucker control activity of ketones according to the invention the following series of 12 greenhouse tests (Examples 27 to 38) were performed. The formulations consisted of 25 percent of the selected ketone compound, 25 percent Maran-D and 50 percent methanol diluted with water to a concentration of 3 percent (unless otherwise noted) active ingredient for spraying. Examples 27, 28, 30 and 31 required a 10 percent spray concentration to achieve meaningful sucker control activity. 10 ml. of the dilute agent was sprayed on the upper foliage of the deflowered tobacco plants two days after topping: Visual observations were made and sucker growth activity tabulated as shown in the table below, 18 to 19 days after treatment.

| Tobacco Sucker Control | | | |
|---|---|---|---|
| Example | Compound | Phytotoxicity | Sucker Control Activity |
| 27 | 2-Butanone | none | yes |
| 28 | 2-Pentanone | non-trace | yes |
| 29 | 2-Hexanone | none | yes |
| 30 | 2-Heptanone | none | yes |
| 31 | 2-Octanone | non-trace | yes |
| 32 | 2-Nonanone | mild-moderate | yes |
| 33 | 2-Decanone | low | yes |
| 34 | 3-Dodecanone | low | yes |
| 35 | 6-Undecanone | none | yes |
| 36 | 2-Methyl-3-decanone | none | yes |
| 37 | 2-Tridecanone | low | yes |
| 38 | 4-Nonylcyclo- | none | yes |

While the instant invention has been described in full detail in a considerable number of similar examples for purposes of valid comparison of results, it will be apparent to those skilled in the art that the present compositions and treating methods are subject to many variations and modifications within the scope of the foregoing disclosure. Accordingly this invention should not be construed as limited in any particulars, except as may be recited in the appended claims or required by the prior art.

What is claimed is:

1. A method for controlling the axillary growth known as suckers between a tobacco plant leaf and stalk which comprises contacting said plant with an amount, sufficient to inhibit sucker development, of a composition comprising a substantially non-volatile $C_4 - C_{18}$ saturated aliphatic hydrocarbon monoketone.

2. The method of claim 1 comprising contacting the tobacco plant with a composition comprising an amount, sufficient to inhibit sucker development of a substantially non-volatile $C_4 - C_{18}$ saturated aliphatic hydrocarbon monoketone and an inert solid or liquid carrier therefor, wherein said composition is water miscible and said monoketone is admixed with a surfactant.

3. A method as defined in claim 1, wherein said monoketone is a 2-ketone.

4. A method as defined in claim 1, wherein said monoketone is 2-dodecanone.

5. A method as defined in claim 1, wherein said monoketone is 2-undecanone.

6. A method as defined in claim 1, wherein said monoketone is 2-butanone.

7. A method as defined in claim 1, wherein said monoketone is 2-tridecanone.

8. A method as defined in claim 1, wherein said monoketone is 3-dodecanone.

9. A method as defined in claim 1, wherein the monoketone is 2-methyl-3-decanone.

10. A method as defined in claim 1, wherein the monoketone is 4-nonylcyclohexanone.

* * * * *

PO-1050
(5/69)

UNITED STATES PATENT OFFICE
CERTIFICATE OF CORRECTION

Patent No. 3,853,532　　　　　　Dated December 10, 1974

Inventor(s) BURTON MAXWELL REIN and BENJAMIN WEINSTEIN

It is certified that error appears in the above-identified patent and that said Letters Patent are hereby corrected as shown below:

Column 5, under * No. 1 in the Example "(1) "Maran B" should read -- (1) "Maran D" --.

Column 6 Table Example 20 under phytotoxicity "yes" should read -- none --.

Column 6, Table Example 22 under phytotoxicity "yes" should read -- none --.

Column 6, Table Example 24 under phytotoxicity "yes" should read -- substantial --.

Column 8, Table under Compound, Example 38 "4-Nonylcyclo-" should read -- 4-Nonylcyclohexanone --.

Signed and sealed this 4th day of March 1975.

(SEAL)
Attest:

RUTH C. MASON
Attesting Officer

C. MARSHALL DANN
Commissioner of Patents
and Trademarks